United States Patent
Kagami et al.

(10) Patent No.: US 9,765,791 B2
(45) Date of Patent: Sep. 19, 2017

(54) TURBO COMPRESSOR (71) Applicant: KABUSHIKI KAISHI TOYOTA JIDOSHOKKI, Aichi-ken (JP)

(72) Inventors: Masanao Kagami, Aichi (JP); Ryo Umeyama, Aichi (JP); Ryosuke Fukuyama, Aichi (JP)

(73) Assignee: Kabushiki Kaisha Toyota Jidoshokki (JP)

( * ) Notice: Subject to any disclaimer, the term of this patent is extended or adjusted under 35 U.S.C. 154(b) by 330 days.

(21) Appl. No.: 14/644,986

(22) Filed: Mar. 11, 2015

(65) Prior Publication Data

US 2015/0260194 A1 Sep. 17, 2015

(30) Foreign Application Priority Data

Mar. 12, 2014 (JP) ................................. 2014-048610

(51) Int. Cl.
F04D 29/059 (2006.01)
F16C 19/50 (2006.01)
(Continued)

(52) U.S. Cl.
CPC ......... F04D 29/059 (2013.01); F04D 25/045 (2013.01); F04D 25/06 (2013.01);
(Continued)

(58) Field of Classification Search
CPC ...... F04D 29/059; F04D 29/05; F04D 29/053; F04D 29/056; F04D 29/18; F04D 29/403;
(Continued)

(56) References Cited

U.S. PATENT DOCUMENTS 2,828,938 A * 4/1958 Roesch ................... F01D 25/16
310/83
3,380,312 A * 4/1968 Barske ................... F16H 13/02
476/61
(Continued)

FOREIGN PATENT DOCUMENTS

DE 10 2008 023597 A1 11/2009
GB 1000877 A 8/1965
(Continued)

OTHER PUBLICATIONS

European Patent Application No. 15158189.9-1608: Extended European Search Report dated Aug. 6, 2015, 6 pages.
(Continued)

*Primary Examiner* — Woody Lee, Jr.
*Assistant Examiner* — Eric Zamora Alvarez
(74) *Attorney, Agent, or Firm* — Baker & Hostetler LLP (57) ABSTRACT To provide a turbo compressor rotatable at high speed that is capable of being downsized, and of being suppressed in performance deterioration at low speed rotation. A turbo compressor includes a housing, a rotating shaft, a motor, a compressor mechanism, and a support section. The support section includes at least three rollers on the rotating shaft, roller shaft portions on the rollers, and a roller bearing portion for supporting the roller shaft portions. The rollers and the rotating shaft respectively have a drive transmission portion for drive transmission from the rotating shaft to each of the rollers, and the drive transmission portion of the rollers has a diameter larger than a diameter of the drive transmission portion of the rotating shaft.

4 Claims, 7 Drawing Sheets (51) Int. Cl.
  *F04D 25/04*    (2006.01)
  *F04D 29/053*   (2006.01)
  *F04D 29/18*    (2006.01)
  *F04D 29/40*    (2006.01)
  *F04D 25/06*    (2006.01)
  *F04D 29/056*   (2006.01)

(52) U.S. Cl.
  CPC ......... *F04D 29/053* (2013.01); *F04D 29/056* (2013.01); *F04D 29/18* (2013.01); *F04D 29/403* (2013.01); *F16C 19/507* (2013.01); *F16C 2360/44* (2013.01); *F16C 2380/26* (2013.01)

(58) Field of Classification Search
  CPC ........ F04D 17/00; F04D 17/10; F04D 17/168; F04D 25/045; F04D 25/06; F16C 19/507; F16C 2380/26
  USPC .......................................................... 384/549
  See application file for complete search history.

(56) References Cited

U.S. PATENT DOCUMENTS

| | | | | |
|---|---|---|---|---|
| 3,650,634 A | * | 3/1972 | Osborne | F04D 25/02 277/431 |
| 4,249,784 A | * | 2/1981 | Ichikawa | F16C 13/04 384/494 |
| 4,371,218 A | * | 2/1983 | Ichikawa | D01H 4/12 310/90.5 |
| 4,649,307 A | | 3/1987 | Bech | |
| 4,926,493 A | | 5/1990 | Junker | |
| 6,796,126 B2 | * | 9/2004 | Hasegawa | F01D 5/026 123/559.1 |
| 7,458,369 B2 | * | 12/2008 | Ozawa | F01D 25/20 123/559.1 |
| 2012/0014801 A1 | * | 1/2012 | Small | F04D 29/444 416/204 R |

FOREIGN PATENT DOCUMENTS

| | | |
|---|---|---|
| JP | H01-246001 A | 10/1989 |
| JP | 2004-239407 A | 8/2004 |
| JP | 2009-281213 A | 12/2009 |

OTHER PUBLICATIONS

Japanese Patent Application No. 2014-048610: Notification of Reasons for Refusal dated Apr. 11, 2017, 6 pages.

\* cited by examiner

TURBO COMPRESSOR

CROSS-REFERENCE

This application claims priority to Japanese patent application No. 2014-048610 filed on Mar. 12, 2014, the contents of which are entirely incorporated herein by reference.

BACKGROUND OF THE INVENTION

Field of the Invention

The present invention relates to a turbo compressor.

Description of the Related Art

Conventionally, turbo compressors that compress air or the like by driving a compressor mechanism by a motor have been used for various applications. For example, Japanese Patent Laid-Open No. 2009-281213 discloses a configuration in which a motor is attached to one end of a rotating shaft, and an impeller of a compressor mechanism is attached to the other end of the rotating shaft, so that a rotating force of the motor is directly transmitted to the impeller via the rotating shaft. In the configuration disclosed in Japanese Patent Laid-Open No. 2009-281213, the rotating shaft is supported in a floated state by a magnetic bearing mechanism with regard to a thrust direction, and is supported by air drawn in between the rotating shaft and a bearing foil by a foil bearing mechanism with regard to a radial direction.

PATENT LITERATURE

[Patent Literature 1] JP-A-2009-281213

However, since the magnetic bearing mechanism provided in the configuration of Japanese Patent Laid-Open No. 2009-281213 requires a magnetic generator and a magnetic force controller, the entire apparatus has a larger size, and the cost is increased. Also, axial runout tends to occur in the rotating shaft at the time of low-speed rotation, thereby possibly causing a deterioration of the performance of the compressor mechanism. Also, there is a possibility that the rotating shaft and the bearing mechanism come into contact with each other and are thereby worn away due to the axial runout at the time of low-speed rotation or at the initial stage of startup. Thus, there is room for improvement when the low-speed rotation is performed.

A ball bearing mechanism, instead of the magnetic bearing mechanism and the foil bearing mechanism, may be also employed as the bearing mechanism for the rotating shaft that rotates at high speed. In this case, however, it is necessary to apply a preload to the bearing mechanism in the thrust direction. The preload causes a friction loss, which results in performance deterioration in the compressor mechanism. Also, the bearing mechanism is easily worn away by the preload, which will be disadvantageous in terms of durability. While the durability can be improved by the use of a bearing member having high durability, the cost is increased in this case. In addition, there is also a problem that the magnitude or the balance of the preload cannot be easily adjusted.

An oil floating bearing mechanism may be also employed instead of the above bearing mechanisms. In this case, however, the axial runout tends to occur at the time of low-speed rotation, and the friction loss becomes larger. Thus, there is room for improvement when the low-speed rotation is performed.

The present invention has been made in view of such circumstances, and an object of the present invention is to provide a turbo compressor rotatable at high speed that is capable of being downsized, and is capable of being suppressed in performance deterioration at low speed rotation so as to achieve low cost merits.

SUMMARY OF THE INVENTION

In accordance with one aspect of the present invention, a turbo compressor includes a housing, a rotating shaft, a motor, a compressor mechanism and a support section.

The rotating shaft is rotatably supported on the housing. The motor is coupled to one end side of the rotating shaft and rotates the rotating shaft. The compressor mechanism is coupled to other end side of the rotating shaft and is rotated with the rotation of the rotating shaft. The support section is provided between the motor and the compressor mechanism and rotatably supports the rotating shaft, and includes at least three rollers that are arranged on the rotating shaft, a roller shaft portion that is provided on each of the rollers, and a roller bearing portion that rotatably supports the roller shaft portion on the housing.

Each of the rollers and the rotating shaft respectively have a drive transmission portion in which a drive force is transmitted from the rotating shaft to each of the rollers. The drive transmission portion of the rollers has a diameter larger than a diameter of the drive transmission portion of the rotating shaft.

DETAILED DESCRIPTION OF THE PREFERRED EMBODIMENTS

A turbo compressor of the present invention can be used for, for example, supplying a compressed fluid to a fuel cell device or an air conditioner. A centrifugal compressor mechanism or an axial compressor mechanism can be employed as a compressor mechanism provided in the turbo compressor of the present invention.

In the turbo compressor of the present invention, a "drive transmission portion of a roller" means a portion of the roller with which the rotating shaft is in contact. Also, a "drive transmission portion of a rotating shaft" means a portion of the rotating shaft with which the roller is in contact. When the both drive transmission portions come into contact with each other, a rotating force of the rotating shaft is transmitted to the roller, and the roller rotates with the rotation of the rotating shaft.

The aforesaid housing preferably includes a compressor housing that accommodates the compressor mechanism, a motor housing that accommodates the motor, and a bearing housing that is arranged between the compressor housing and the motor housing and accommodates the support section. The bearing housing preferably has a roller bearing accommodation section that accommodates the roller bearing portion, and rotatably supports the at least three rollers. In this case, it is not necessary to separately prepare a holding member for holding a roller bearing portion. Thus, the number of components can be reduced.

The aforesaid support section preferably includes a tightening ring that tightens the at least three rollers so as to press the at least three rollers against the rotating shaft.

In this case, the respective rollers can be surely brought into contact with a circumferential surface of the rotating shaft by absorbing the machining tolerances of the rollers. Even when the roller bearing portion has low shape accuracy, the respective rollers can be surely brought into contact with the circumferential surface of the rotating shaft. Thus, the manufacturing cost can be reduced by lowering the shape accuracy of the roller bearing portion. Also, since the respective rollers are pressed against the rotating shaft by the tightening ring, a load applied to the roller bearing portion supporting each of the rollers is mitigated. Accordingly, the lifetime of the roller bearing portion can be extended.

The aforesaid rotating shaft has a pair of flange portions that receive a thrust load applied to the rotating shaft, and the at least three rollers are arranged between the pair of flange portions. In this case, the pair of flange portions determine the positions of the respective rollers in a thrust direction. Moreover, the pair of flange portions rotate integrally with the rotating shaft. Each of the rollers rotates on its own axis in contact and synchronization with the rotating shaft. Thus, a circumferential speed of the respective rollers can be matched with a circumferential speed of the rotating shaft. As a result, a friction generated between the respective rollers and the pair of flange portions can be reduced. Accordingly, the lifetime of the respective rollers can be extended.

EMBODIMENTS

Embodiment 1

Figure 1:
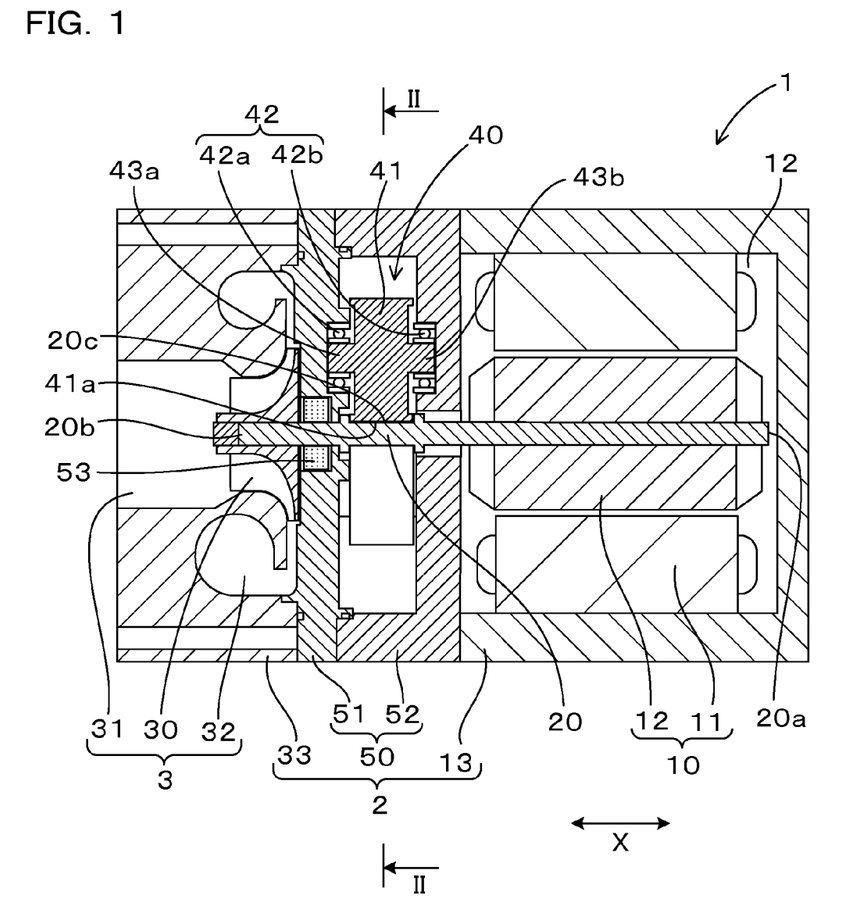
FIG. 1 is a sectional view of a turbo compressor in Embodiment 1.
Figure 2:
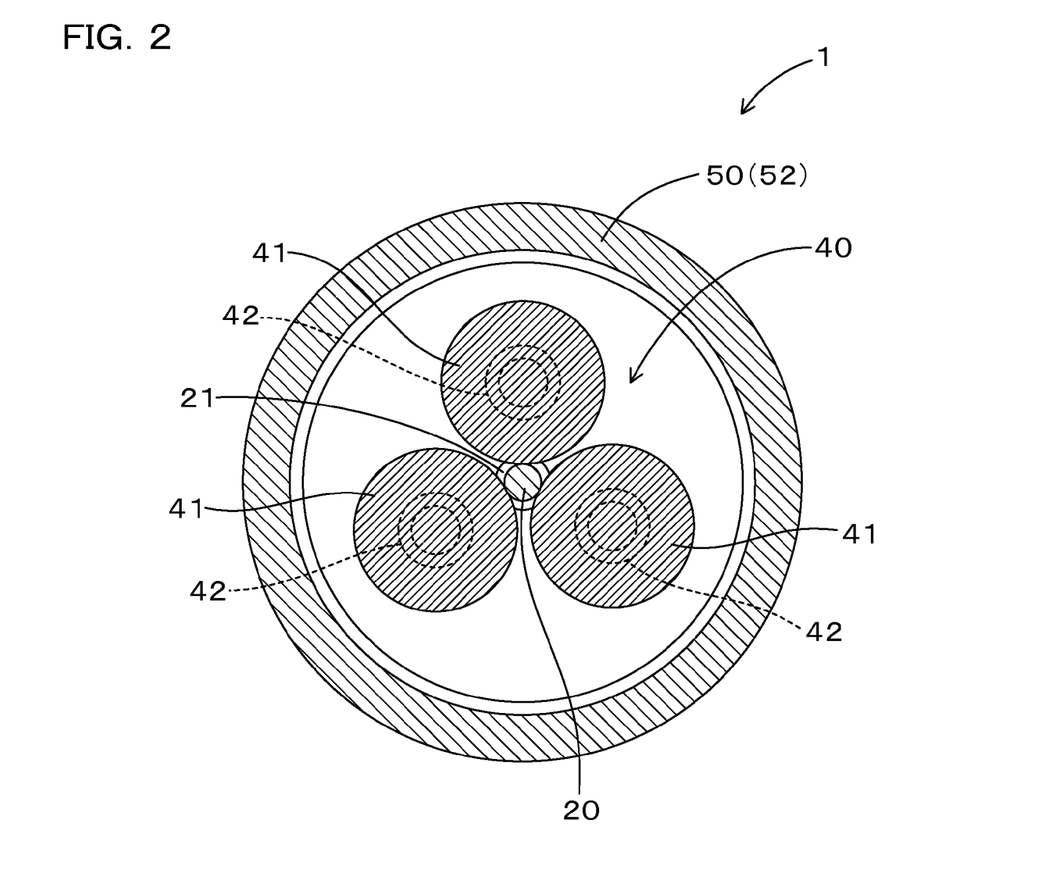
FIG. 2 is a sectional view taken along a line II-II in FIG. 1.
Figure 3:
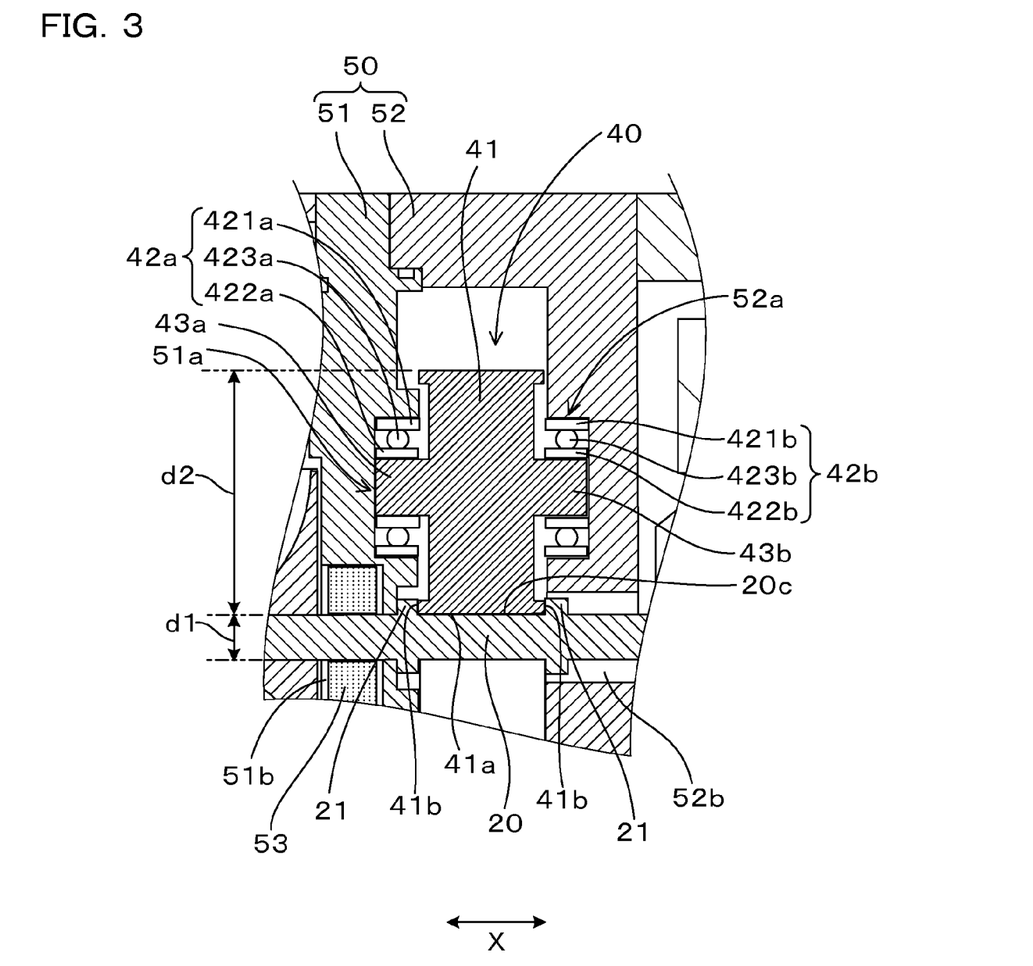
FIG. 3 is a partially enlarged view around a roller in FIG. 1.

A turbo compressor according to the present embodiment is described using FIGS. 1 to 3.

As shown in FIG. 1, a turbo compressor 1 of the present embodiment includes a rotating shaft 20 that is rotatably supported on a housing 2, a motor 10 that is coupled to one end side 20a of the rotating shaft 20 and rotates the rotating shaft 20, a compressor mechanism 3 that is coupled to the other end side 20b of the rotating shaft 20 and is rotated along with the rotation of the rotating shaft 20, and a support section 40 that is provided between the motor 10 and the compressor mechanism 3 and rotatably supports the rotating shaft 20.

The support section 40 includes at least three rollers 41 that are provided on the rotating shaft 20, roller shaft portions 43a and 43b that are provided on each of the rollers 41, and a roller bearing portion 42 that rotatably supports the roller shaft portions 43a and 43b on the housing 2.

As shown in FIG. 3, a diameter d2 of each of the rollers 41 at the position of a drive transmission portion 41a is larger than a diameter d1 of the rotating shaft 20 at the position of a drive transmission portion 20c.

In the following, the turbo compressor 1 of the present embodiment is described in detail.

As shown in FIG. 1, a rotor 12 of the motor 10 is fixed to the one end side 20a of the rotating shaft 20, and an impeller 30 of the compressor mechanism 3 is fixed to the other end side 20b. The rotating shaft 20 is a rod-like steel member. An axial direction (a thrust direction) of the rotating shaft 20 is referred to as X. In the rotating shaft 20, a circumferential surface of a center portion located between the motor 10 and the compressor mechanism 3 abuts against a circumferential surface of each of the rollers 41, and thereby forms the drive transmission portion 20c that transmits a rotating force of the rotating shaft 20 to the rollers 41.

The compressor mechanism 3 is a centrifugal compressor. The compressor mechanism 3 includes the impeller 30, an intake port 31, and a scroll chamber 32, and is accommodated in a compressor housing 33. The motor 10 includes a stator 11 and the rotor 12, and is accommodated in a motor housing 13. The stator 11 is formed in an annular shape so as to surround the rotor 12, and is fixed within the motor housing 13. The rotor 12 is surrounded by the stator 11, and is capable of rotating.

As shown in FIG. 1, the support section 40 includes the rollers 41, the roller shaft portions 43a and 43b, and the roller bearing portion 42. The rollers 41 are formed of a material, such as a steel material, having wear resistance. As shown in FIG. 2, the three rollers 41 are employed in the present embodiment. The rollers 41 are disposed around the rotating shaft 20 at equal intervals on the radially outer side of the rotating shaft 20. As shown in FIG. 3, all of the rollers 41 have a columnar shape. Each of the rollers 41 abuts against the circumferential surface of the drive transmission portion 20c in the rotating shaft 20 to provide the drive transmission portion 41a to which the rotating force of the rotating shaft 20 is transmitted. The roller shaft portions 43a and 43b that respectively project in the axial direction X are formed in the centers of both side surfaces in the axial direction X of each of the rollers 41.

The support section 40 is accommodated in a bearing housing 50. The bearing housing 50 is composed of an impeller-side bearing housing 51 that forms a portion on the side of the impeller 30, and a motor-side bearing housing 52 that forms a portion on the side of the motor 10. As shown in FIG. 3, a roller bearing accommodation section 51a is formed in the impeller-side bearing housing 51 in a recessed shape along an outer edge of an outer race 421a of a roller bearing portion 42a described below. A roller bearing accommodation section 52a is also formed in the motor-side bearing housing 52 along an outer edge of an outer race 421b of a roller bearing portion 42b described below. A through hole 51b through which the rotating shaft 20 is inserted is formed in the impeller-side bearing housing 51. The through hole 51b is provided with an oil seal 53 that seals a gap between the impeller-side bearing housing 51 and the rotating shaft 20. A through hole 52b through which the rotating shaft 20 is inserted is formed in the motor-side bearing housing 52. The through hole 52b is not provided with an oil seal.

As shown in FIG. 1, each of the rollers 41 is rotatably supported by the roller bearing portion 42 via the roller shaft portions 43a and 43b. The roller bearing portion 42a disposed on the side of the impeller 30, and the roller bearing portion 42b disposed on the motor side are provided as the roller bearing portion 42. As shown in FIG. 3, both of the roller bearing portions 42a and 42b are ball bearings. The roller bearing portion 42a includes the outer race 421a and an inner race 422a each having a ring shape. A ball 423a is held between the both races by a holder (not shown). The roller bearing portion 42b includes the outer race 421b and an inner race 422b each having a ring shape. A ball 423b is held between the both races 421b and 422b by a holder (not shown).

The roller bearing portion 42a is attached to the impeller-side bearing housing 51 with the outer race 421a fitted into the roller bearing accommodation section 51a of the impeller-side bearing housing 51. The roller shaft portion 43a of each of the rollers 41 projecting toward the impeller 30 is fitted into the inner race 422a of the roller bearing portion 42a. The roller bearing portion 42b is attached to the motor-side bearing housing 52 with the outer race 421b fitted into the roller bearing accommodation section 52a of the motor-side bearing housing 52. The roller shaft portion 43b of each of the rollers 41 projecting toward the motor 10 is fitted into the inner race 422b of the roller bearing portion 42b. Accordingly, each of the rollers 41 is held on the bearing housing 50 so as to be sandwiched between the roller bearing portions 42a and 42b in the axial direction X so as to be rotatable about its own axis in the axial direction X. Motor oil is supplied between the drive transmission portion 41a of each of the rollers 41 and the drive transmission portion 20c of the rotating shaft 20 in the bearing housing 50 from an oil discharge port (not shown) that is provided in the bearing housing 50.

As shown in FIGS. 1 to 3, a pair of flange portions 21 are formed on the rotating shaft 20. The pair of flange portions 21 have a rib shape projecting radially outward in an annular shape on the circumferential surface of the rotating shaft 20. A distance between the pair of flange portions 21 is substantially the same as the length (the width) in the axial direction X of each of the rollers 41. The rollers 41 are disposed between the pair of flange portions 21. The respective rollers 41 are thereby sandwiched between the pair of flange portions 21 in the axial direction X. The circumferential surface of the rotating shaft 20 between the pair of flange portions 21 abuts against the circumferential surface of the drive transmission portion 41a of each of the rollers 41 to form the drive transmission portion 20c in the rotating shaft 20. Moreover, portions 41b of the rollers 41 that correspond to the side surfaces facing the pair of flange portions 21 in the axial direction X of each of the rollers 41 are in sliding contact with side surfaces of the pair of flange portions 21 (corresponding to surfaces facing the rollers 41).

As shown in FIG. 3, the diameter d2 of each of the rollers 41 at the position of the drive transmission portion 41a is larger than the diameter d1 of the rotating shaft 20 at the position of the drive transmission portion 20c with which each of the rollers 41 is in contact (that is, the drive transmission portion 20c of the rotating shaft 20). The diameter d2 at the drive transmission portion 41a of each of the rollers 41 can be designed to be larger than the diameter d1 at the drive transmission portion 20c of the rotating shaft 20, and 20 times or less of the diameter d1. In the present embodiment, the diameter d2 at the drive transmission portion 41a of each of the rollers 41 is five times as large as the diameter d1 at the drive transmission portion 20c of the rotating shaft 20. In the present embodiment, the three rollers 41 are provided. In this case, the diameter d2 at the drive transmission portion 41a of each of the rollers 41 can be designed to be larger than the diameter d1 at the drive transmission portion 20c of the rotating shaft 20, and 12.7 times or less of the diameter d1 at the drive transmission portion 20c of the rotating shaft 20.

The turbo compressor 1 of the present embodiment is used for supplying a compressed fluid in a fuel cell device. The turbo compressor 1 is used in a range in which the rotating speed of the motor 10 is 1000 to 250000 rpm.

Next, the effects of the turbo compressor of the present embodiment are described in detail.

In the turbo compressor 1 of the present embodiment, the support section 40 that rotatably supports the rotating shaft 20 includes at least the three rollers 41 on the rotating shaft 20. Each of the rollers 41 is provided with the roller shaft portions 43a and 43b, and is rotatably supported on the housing 2 by the roller bearing portion 42 via the roller shaft portions 43a and 43b. Therefore, the respective rollers 41 rotate along with the rotation of the rotating shaft 20. Since the diameter d2 of each of the rollers 41 at the position of the drive transmission portion 41a is larger than the diameter d1 of the rotating shaft 20 at the position of the drive transmission portion 20c, the rotating speed of the rollers 41 is smaller than the rotating speed of the rotating shaft 20. Accordingly, the roller bearing portion 42 requires lower durability in comparison with a case in which the rotating shaft 20 is supported by the roller bearing portion 42 without the respective rollers 41 therebetween. As a result, it is not necessary to form the roller bearing portion 42 with a highly-durable material of being costly, and the roller bearing portion 42 can be formed at lower cost so as to achieve low cost merits. Also, since the respective rollers 41 rotate along with the rotation of the rotating shaft 20, a friction generated between the rollers 41 and the rotating shaft 20 is significantly reduced. Consequently, the durability required for the rollers 41 is made lower, so that the rollers 41 can be formed at lower cost so as to achieve low cost merits as well.

As compared with a case in which a magnetic bearing mechanism is employed as a bearing mechanism of the rotating shaft 20, the support section 40 supporting the rotating shaft 20 can be made smaller since no magnetic generator or no magnetic force controller is required. Accordingly, the entire apparatus can be downsized.

Since the respective rollers 41 are provided on the rotating shaft 20, the rollers 41 support the rotating shaft 20 in contact therewith at all times including low-speed rotation and high-speed rotation. Thus, the occurrence of axial runout at the time of low-speed rotation is suppressed. Accordingly, a deterioration in the performance of the turbo compressor 1 at the time of low-speed rotation is suppressed. In the present embodiment, since the turbo compressor 1 is used for supplying a compressed fluid in the fuel cell device, the turbo compressor 1 is used in a wide range in which the rotating speed of the motor 10 is 1000 to 250000 rpm. In the fuel cell device, the performance of the turbo compressor 1 at the time of low-speed rotation with a rotating speed of about 1000 to 50000 rpm greatly affects the fuel consumption. Since the deterioration of the performance of the turbo compressor 1 at the time of low-speed rotation is suppressed as described above, the turbo compressor 1 of the present embodiment can be preferably used as a turbo compressor for the fuel cell device.

In the present embodiment, the housing 2 includes the compressor housing 33 that accommodates the compressor mechanism 3, the motor housing 13 that accommodates the motor 10, and the bearing housing 50 that is arranged between the compressor housing 33 and the motor housing 13 and accommodates the support section 40. In the bearing housing 50, the roller bearing accommodation sections 51a and 52a that accommodate the roller bearing portion 42 are formed. The rollers 41 are rotatably supported by the bearing housing 50. Accordingly, it is not necessary to separately prepare a holding member for holding the roller bearing portion 42. Thus, the number of components can be reduced.

In the present embodiment, the rotating shaft 20 has the pair of flange portions 21 that receive a thrust load applied to the rotating shaft 20, and the three rollers 41 are arranged between the pair of flange portions 21. Accordingly, the pair of flange portions 21 determine the positions of the respective rollers 41 in the thrust direction (the axial direction X). Moreover, the pair of flange portions 21 rotate integrally with the rotating shaft 20. Each of the rollers 41 rotates on its own axis in contact and synchronization with the rotating shaft 20. Thus, a circumferential speed of the respective rollers 41 can be matched with a circumferential speed of the rotating shaft 20. As a result, a friction generated between the respective rollers 41 and the pair of flange portions 21 can be reduced. Accordingly, the lifetime of the respective rollers 41 can be extended.

In a case of a configuration in which the rotating shaft 20 is attached to the motor 10 so as to extend from the motor 10 in both directions of the axial direction X, a thrust force generated on the rotating shaft 20 is canceled to some extent, and a large thrust force is hardly generated on the rotating shaft 20. However, in the present embodiment, a so-called cantilever configuration in which the rotating shaft 20 is attached to the motor 10 so as to extend from the motor 10 in only one direction of the axial direction X is employed. Therefore, a thrust force is difficult to be cancelled, and a large thrust force tends to be generated on the rotating shaft 20 as compared with the case mentioned earlier. However, the friction generated between the respective rollers 41 and the pair of flange portions 21 can be reduced as described above. Accordingly, even when a relatively large thrust force is generated on the rotating shaft 20, the influences on the respective rollers 41 can be reduced.

As shown in FIGS. 1 and 3, in the support section 40, the roller 41 has a columnar shape extending in the axial direction X. The drive transmission portion 41a of each of the rollers 41 is in line contact with the drive transmission portion 20c of the rotating shaft 20 in the axial direction X. Therefore, a large contact area can be ensured in the axial direction X between the drive transmission portions 41a and 20c. Accordingly, the rotating shaft 20 is sufficiently supported in the support section 40, and a high holding force can be thereby obtained for the rotating shaft 20. As a result, even when the cantilever configuration in which the rotating shaft 20 is attached to only one side in the axial direction X of the motor 10 is employed, the motor 10 having a relatively large weight can be supported via the rotating shaft 20. By employing the cantilever configuration, the turbo compressor 1 of the present embodiment can be downsized as a whole as compared with the configuration in which the rotating shaft 20 is attached to the motor 10 so as to extend from the motor 10 in both directions of the axial direction X.

If it is not necessary to decrease the size in the axial direction X, the aforesaid configuration in which the rotating shaft 20 extends from the both sides of the motor 10 in the axial direction X may be employed.

Although the turbo compressor in the present embodiment is provided with the three rollers 41, the present invention is not limited to such configuration, and four or more rollers 41 may be provided. In the present embodiment, all of the three rollers 41 have the same diameter. However, the present invention is not limited thereto, and the diameter of some of the rollers may be different from the diameter of the other rollers.

Figure 4:
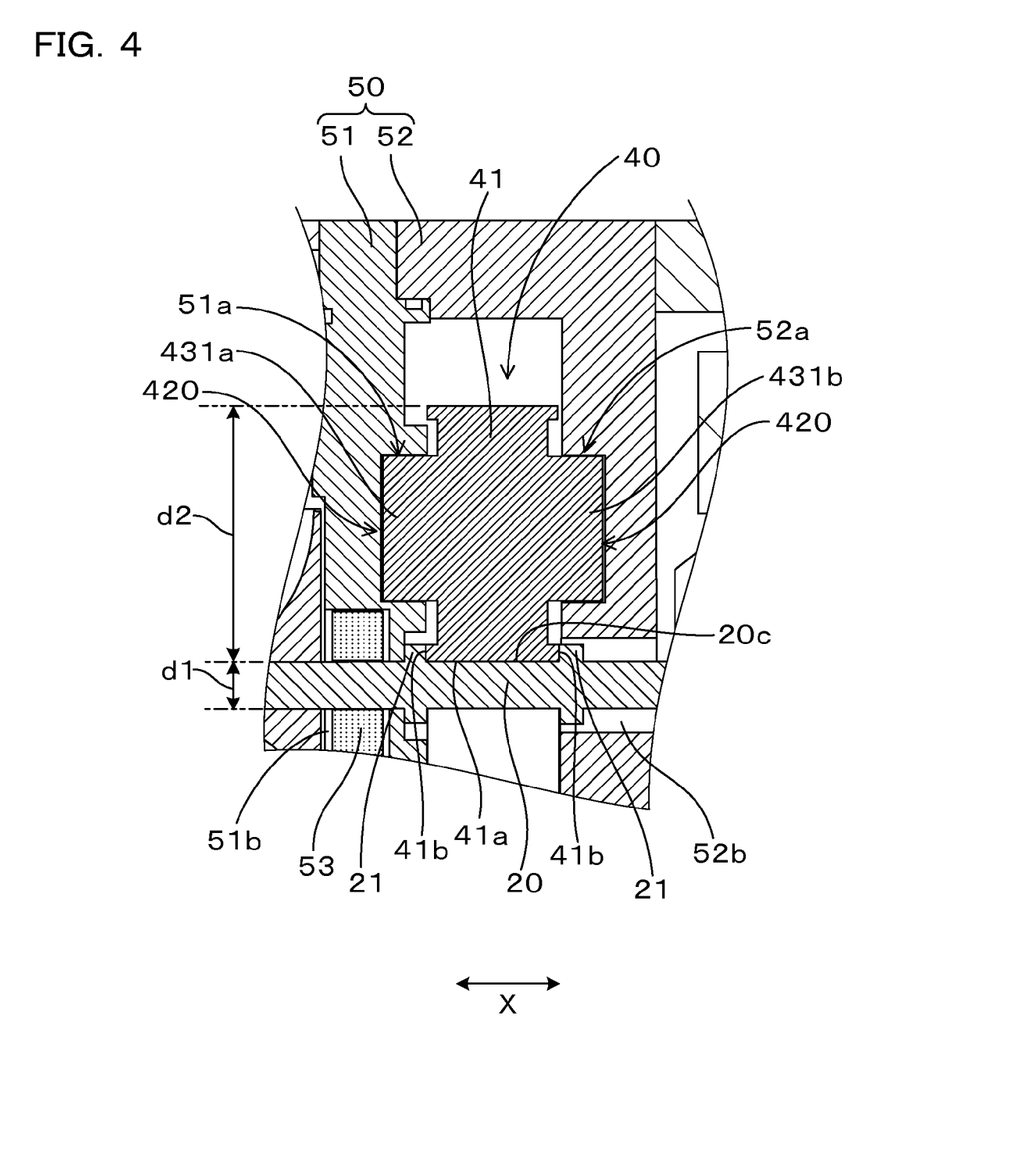
FIG. 4 is a partially enlarged sectional view of a turbo compressor in a modification of Embodiment 1.

Also, although the ball bearing is employed as the roller bearing portion 42 in the present embodiment, the present invention is not limited thereto, and any known bearing mechanism may be employed. For example, a plain bearing may be employed as the roller bearing portion 42 as shown in FIG. 4. To be more specific, as shown in FIG. 4, roller shaft portions 431a and 431b having increased diameter from the diameter of the roller shaft portions 43a and 43b (see FIG. 3) of each of the rollers 41 are formed. The roller shaft portion 431a is fitted to the roller bearing accommodation section 51a of the impeller-side bearing housing 51, and the roller shaft portion 431b is fitted to the roller bearing accommodation section 52a of the motor-side bearing housing 52, thereby forming a roller bearing portion 420 using a plain bearing. The effects equal to those of Embodiment 1 can be also produced in this modification.

Figure 5:
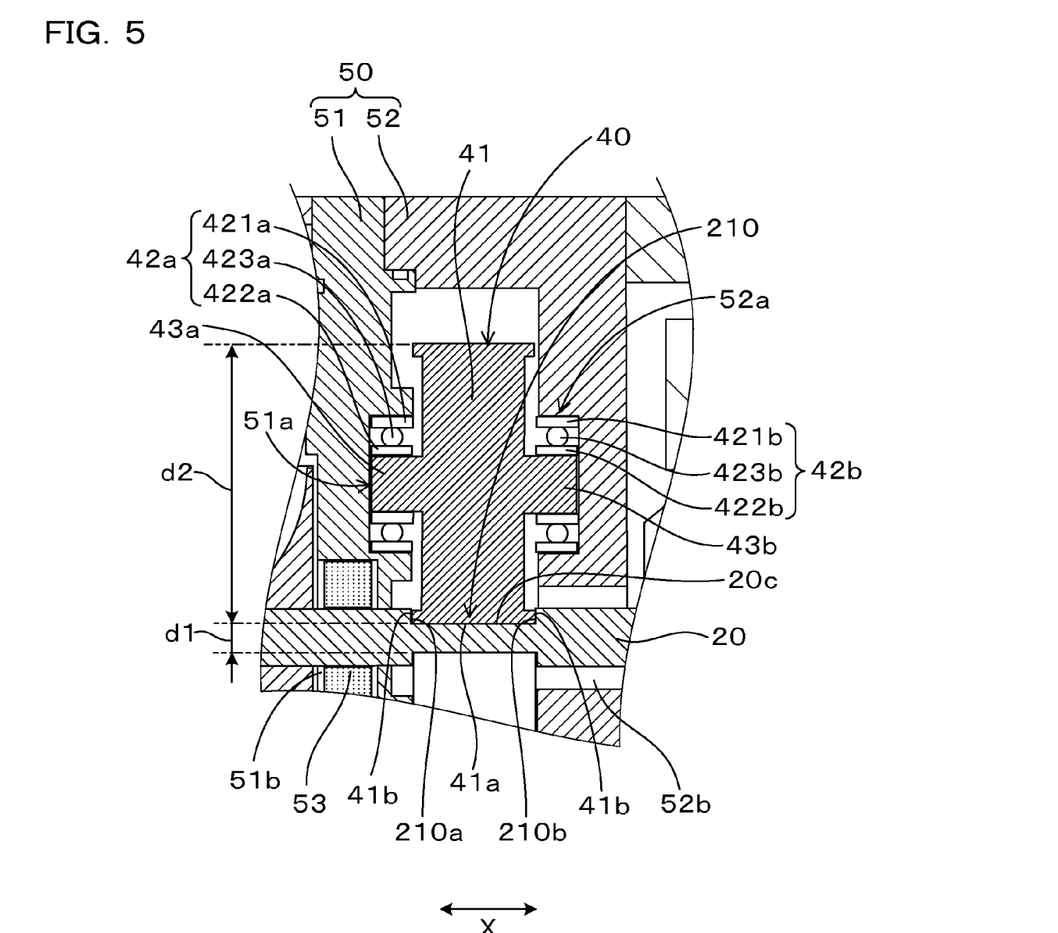
FIG. 5 is a partially enlarged sectional view of a turbo compressor in another modification of Embodiment 1.

Also, although the pair of flange portions 21 are formed in a rib shape in the present embodiment, the present invention is not limited thereto. As shown in FIG. 5, an annular groove 210 may be formed in the circumferential surface of the rotating shaft 20, and opposite wall surfaces in the axial direction X of the groove 210 may be employed as a pair of flange portions 210a and 210b. The length (the width) in the axial direction X of the groove 210 corresponds to the length (the width) in the axial direction X of each of the rollers 41. When the rollers 41 are fitted to the groove 210, the positions of the rollers 41 are determined in the axial direction (the thrust direction) X. The effects equal to those of Embodiment 1 can be also produced in this modification.

As described above, in accordance with the present embodiment, it is possible to provide a turbo compressor 1 rotatable at high speed that is capable of being downsized, and is capable of being suppressed in performance deterioration at low speed rotation so as to achieve low cost merits.

Embodiment 2

Figure 6:
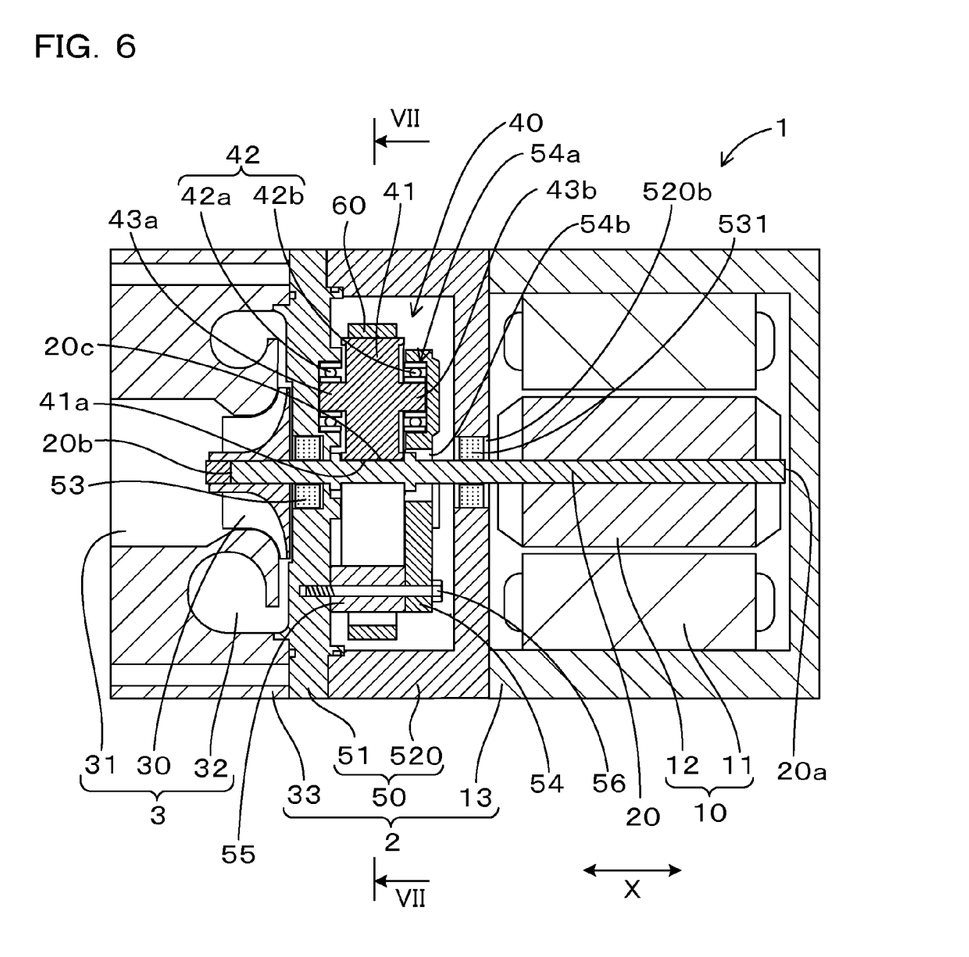
FIG. 6 is a sectional view of a turbo compressor in Embodiment 2.

A turbo compressor 1 of the present embodiment includes a motor-side bearing housing 520 shown in FIG. 6 instead of the motor-side bearing housing 52 (see FIG. 1) in Embodiment 1, and also includes a holding member 54 and a tightening ring 60. The other constituent elements are equal to those of Embodiment 1, and are assigned the same reference numerals as those of Embodiment 1 in the present embodiment, and the description is omitted.

As shown in FIG. 6, the roller bearing accommodation section 52a (see FIG. 3) is not formed in the motor-side bearing housing 520, but the holding member 54 is provided on the side of the motor 10 of the rollers 41. The holding member 54 is a substantially-circular planar member, and is attached to the three rollers 41 on the side of the motor 10 via a columnar leg portion 55 that is erected on the impeller-side bearing housing 51. A roller bearing accommodation section 54a is formed along the roller bearing portion 42b in a portion of the holding member 54 facing each of the rollers 41 to accommodate the roller bearing portion 42b. A through hole 54b through which the rotating shaft 20 is inserted is also formed in the center of the holding member 54.

The holding member 54 is fastened to the leg portion 55 via a long screw 56 with the rotating shaft 20 inserted through the through hole 54b of the holding member 54. The roller bearing portion 42b is thereby fitted into the roller bearing accommodation section 54a. Accordingly, the roller bearing portion 42b is held on the holding member 54. The respective rollers 41 are provided rotatably by the roller bearing portions 42a and 42b in the support section 40 in a similar manner to Embodiment 1.

Figure 7:
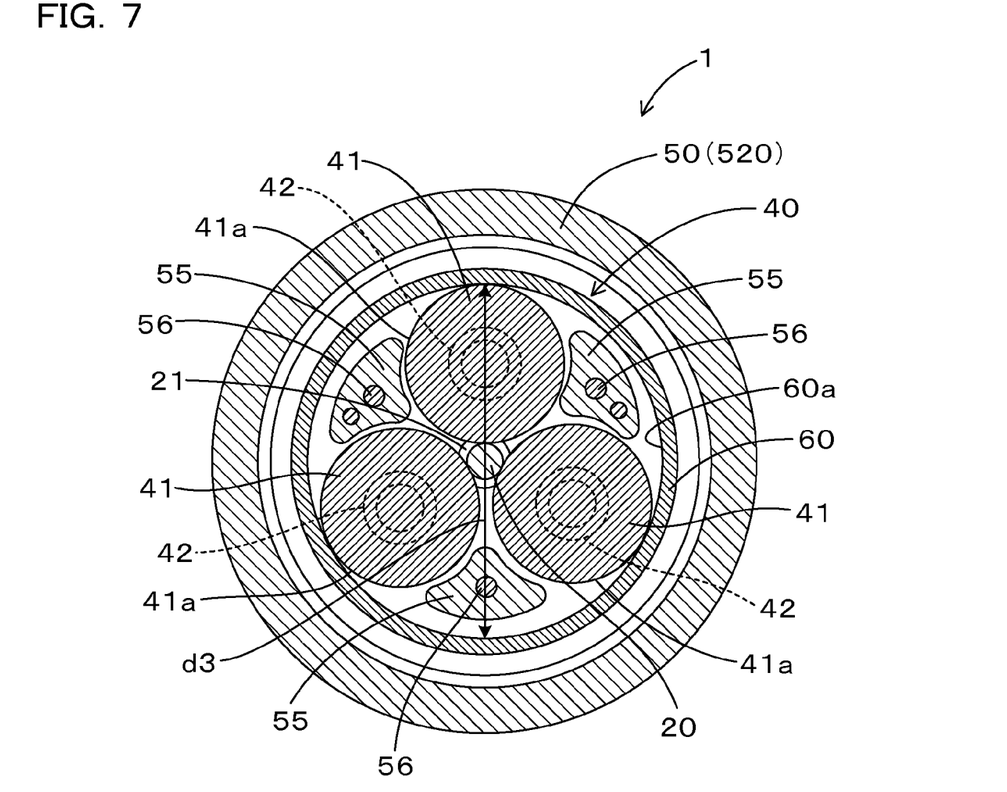
FIG. 7 is a sectional view taken along a line VII-VII in FIG. 6.

The support section 40 includes the tightening ring 60 that tightens the three rollers 41 so as to collectively press the three rollers 41 against the circumferential surface of the drive transmission portion 20c in the rotating shaft 20 as shown in FIGS. 6 and 7. The tightening ring 60 is a ring member formed in a belt-like shape, and the width (the length in the axial direction X) of the tightening ring 60 is slightly smaller than the width of the rollers 41. As shown in FIG. 7, the tightening ring 60 is disposed concentrically with the rotating shaft 20, and an inner diameter d3 of the tightening ring 60 has a length obtained by adding the diameter of the single rotating shaft 20 and the diameters of the two rollers 41 together. Accordingly, the circumferential surfaces of the drive transmission portions 41a in the three rollers 41 come into contact with an inner surface 60a of the tightening ring 60. The leg portion 55 is located between the adjacent rollers 41 and in the position toward the rotating shaft 20 apart from the inner surface 60a of the tightening ring 60. Therefore, the leg portion 55 is not in contact with the inner surface 60a of the tightening ring 60.

As shown in FIG. 6, in the bearing housing 50, the circumferential surface of the drive transmission portion 41a in each of the rollers 41 and the circumferential surface of the drive transmission portion 20c in the rotating shaft 20 are in contact with each other. Traction oil is supplied between the drive transmission portions 41a and 20c from an oil discharge port (not shown). A through hole 520b through which the rotating shaft 20 is inserted is formed in the motor-side bearing housing 520. An oil seal 531 that seals a gap between the motor-side bearing housing 520 and the rotating shaft 20 is provided in the through hole 520b.

Next, the effects of the turbo compressor 1 of the present embodiment are described in detail.

In the present embodiment, the support section 40 includes the tightening ring 60. Thus, the respective rollers 41 can be surely brought into contact with the circumferential surface of the drive transmission portion 20c of the rotating shaft 20 by absorbing the machining tolerances of the rollers 41. Even when the roller bearing portion 42 has low shape accuracy, the respective rollers 41 can be surely brought into contact with the circumferential surface of the drive transmission portion 20c of the rotating shaft 20. Thus, the manufacturing cost can be reduced by lowering the shape accuracy of the roller bearing portion 42. Also, since the respective rollers 41 are pressed against the rotating shaft 20 by the tightening ring 60, a load on the roller bearing portion 42 supporting each of the rollers 41 is mitigated. Accordingly, the lifetime of the roller bearing portion 42 can be extended.

In the present embodiment, the traction oil supplied as lubricant oil is supplied to the support section 40. The rollers 41 are always pressed against the rotating shaft 20 by the tightening ring 60. Accordingly, the traction oil entering between the circumferential surface of the drive transmission portion 41a in each of the rollers 41 and the circumferential surface of the drive transmission portion 20c of the rotating shaft 20 is strongly pressurized, and is thereby instantaneously vitrified. As a result, a frictional force between the drive transmission portion 41a of each of the rollers 41 and the drive transmission portion 20c of the rotating shaft 20 is largely increased, thereby preventing slip of the rollers 41 on the rotating shaft 20, and the rollers 41 rotate on their own axes surely in synchronization with the rotation of the rotating shaft 20. Wear of the rollers 41 is thereby prevented, and the lifetime of the rollers 41 can be extended. Since the traction oil has conductivity and high viscosity, the gap between the motor-side bearing housing 520 and the rotating shaft 20 is sealed by the oil seal 531 provided in the through hole 520b of the motor-side bearing housing 520 so as to surely prevent leakage of the oil from the through hole 520b to the motor 10.

As different from the case of Embodiment 1, in the present embodiment, the roller bearing accommodation section 52a (see FIG. 3) for fitting the roller bearing portion 42b is not formed in the motor-side bearing housing 520, but the holding member 54 having the roller bearing accommodation section 54a for fitting the roller bearing portion 42b is provided on the side of the motor 10. That is, the roller bearing portion 42b is not held by the motor-side bearing housing 520, but is held by the holding member 54. On the other hand, the roller bearing portion 42a on the side of the impeller 30 is fitted into and held by the roller bearing accommodation section 51a of the impeller-side bearing housing 51. Instead, a holding member 54 having a roller bearing accommodation section for fitting the roller bearing portion 42a may be provided on the side of the impeller 30 without forming the roller bearing accommodation section 51a in the impeller-side bearing housing 51.

The turbo compressor 1 of the present embodiment produces the effects equal to those of Embodiment 1 except for the effect obtained when the roller bearing portion 42 is held on the bearing housing 50 via the roller bearing accommodation section 52a of the motor-side bearing housing 52 in Embodiment 1.

1 Turbo compressor
2 Housing
3 Compressor mechanism
10 Motor
20 Rotating shaft
20c, 41a Drive transmission portion
30 Impeller
40 Support section
41 Roller
42, 42a, 42b Roller bearing portion
43a, 43b, 431a, 431b Roller shaft portion
50 Bearing housing
51a, 52a, 54a Roller bearing accommodation section
54 Holding member
60 Tightening ring

What is claimed is:
1. A turbo compressor comprising:
a housing;
a rotating shaft that is rotatably supported on the housing;
a motor that is coupled to one end side of the rotating shaft and rotates the rotating shaft;
a compressor that is coupled to other end side of the rotating shaft and is rotated with the rotation of the rotating shaft; and
a support section that is provided between the motor and the compressor and rotatably supports the rotating shaft,
wherein the rotating shaft extends through the support section and the support section comprises at least three rollers that are arranged on the rotating shaft, a roller shaft portion that is provided on each of the rollers, and a roller bearing portion that rotatably supports the roller shaft portion on the housing, and
each of the rollers and the rotating shaft respectively have a drive transmission portion in which a drive force is transmitted from the rotating shaft to each of the rollers, and the drive transmission portion of the rollers has a diameter larger than a diameter of the drive transmission portion of the rotating shaft.

2. The turbo compressor according to claim 1,
wherein the housing comprises a compressor housing that accommodates the compressor, a motor housing that accommodates the motor, and a bearing housing that is arranged between the compressor housing and the motor housing and accommodates the support section, the bearing housing has a roller bearing accommodation section that accommodates the roller bearing portion, and rotatably supports the at least three rollers.

3. The turbo compressor according to claim 1,
wherein the support section comprises a tightening ring that tightens the at least three rollers so as to press the at least three rollers against the rotating shaft.

4. The turbo compressor according to claim 1,
wherein the rotating shaft has a pair of flange portions that receive a thrust load applied to the rotating shaft, and the at least three rollers are arranged between the pair of flange portions.

* * * * *